(12) United States Patent
Bourolleau et al.

(10) Patent No.: US 12,366,173 B2
(45) Date of Patent: Jul. 22, 2025

(54) FAN CASING FOR AN AIRCRAFT TURBOMACHINE

(71) Applicant: SAFRAN AIRCRAFT ENGINES, Paris (FR)

(72) Inventors: Clément Bourolleau, Moissy-Cramayel (FR); Vincent Pascal Fiore, Moissy-Cramayel (FR); Anwer Siraj, Moissy-Cramayel (FR); Alexandre Branco, Moissy-Cramayel (FR); Serge Domingues, Moissy-Cramayel (FR)

(73) Assignee: SAFRAN, Paris (FR)

( * ) Notice: Subject to any disclaimer, the term of this patent is extended or adjusted under 35 U.S.C. 154(b) by 0 days.

(21) Appl. No.: 17/425,455

(22) PCT Filed: Jan. 30, 2020

(86) PCT No.: PCT/FR2020/050148
§ 371 (c)(1),
(2) Date: Jul. 23, 2021

(87) PCT Pub. No.: WO2020/157438
PCT Pub. Date: Aug. 6, 2020

(65) Prior Publication Data
US 2022/0099108 A1    Mar. 31, 2022

(30) Foreign Application Priority Data
Jan. 30, 2019    (FR) ........................ 1900835

(51) Int. Cl.
*F01D 11/12*    (2006.01)
*F01D 25/24*    (2006.01)
(Continued)

(52) U.S. Cl.
CPC .......... *F01D 11/122* (2013.01); *F01D 25/243* (2013.01); *F02C 3/06* (2013.01);
(Continued)

(58) Field of Classification Search
CPC ........ F01D 11/08; F01D 11/12; F01D 11/122; F01D 11/127; F01D 25/24; F01D 25/243;
(Continued)

(56) References Cited

U.S. PATENT DOCUMENTS 2,447,957 A * 8/1948 Moore .................... F01D 11/08
                                                        415/113
6,340,286 B1 * 1/2002 Aksit .................... F01D 11/122
                                                        415/174.4
(Continued)

FOREIGN PATENT DOCUMENTS

| EP | 1 113 146 A2 | 7/2001 | |
|---|---|---|---|
| FR | 2 913 053 A1 | 8/2008 | |
| FR | 3037854 A1 * | 12/2016 | .......... B29C 70/086 |

OTHER PUBLICATIONS

FR3037854A1_Machine_Translation (Castanie, J.) Dec. 30, 2016. [retrieved on Apr. 27, 2023] Retrieved from: Espacenet (Year: 2016).*
(Continued)

*Primary Examiner* — Elton K Wong
(74) *Attorney, Agent, or Firm* — CHRISTENSON O'CONNOR JOHNSON KINDNESS PLLC

(57) ABSTRACT

A fan casing for an aircraft turbomachine includes an annular body extending around an axis and equipped with an annular attachment flange at each of its axial ends. The casing further includes an annular coating made from abradable material, wherein the body is made from a composite material, and further includes an annular stiffener that is arranged inside the body and that carries the coating. The stiffener includes an annular ring, a radially outer face of which is separated radially from the body and a radially inner face of which receives the coating. The stiffener further includes annular attachment tabs configured to the wall to the body.

21 Claims, 4 Drawing Sheets

(51) Int. Cl.
*F02C 3/06* (2006.01)
*F04D 29/52* (2006.01)

(52) U.S. Cl.
CPC ...... *F04D 29/522* (2013.01); *F05D 2220/323* (2013.01); *F05D 2230/60* (2013.01); *F05D 2300/611* (2013.01)

(58) Field of Classification Search
CPC .............. F04D 29/522; F04D 29/526; F05D 2220/323; F05D 2300/603; F05D 2300/611; F05D 2230/60; F05D 21/045
See application file for complete search history.

(56) References Cited

U.S. PATENT DOCUMENTS

| | | | | |
|---|---|---|---|---|
| 2008/0284109 | A1 | 11/2008 | Northfield | |
| 2013/0045370 | A1* | 2/2013 | Aho | B29C 35/0266 29/888.3 |
| 2014/0367920 | A1* | 12/2014 | Konigs | F01D 25/24 264/157 |
| 2015/0308290 | A1* | 10/2015 | Kappes | F01D 21/045 415/200 |
| 2016/0069195 | A1* | 3/2016 | Hewitt | F01D 5/20 416/241 B |
| 2016/0333789 | A1* | 11/2016 | Corradini | F02C 7/25 |
| 2017/0159671 | A1* | 6/2017 | Merriman | F01D 11/08 |
| 2017/0266893 | A1* | 9/2017 | Marin | F01D 21/045 |

OTHER PUBLICATIONS

Zhu, D. Aerospace Ceramic Materials: Thermal, Environmental Barrier Coatings and SiC/SiC Ceramic Matrix Composites for Turbine Engine Applications. [online], May 2018 [retrieved on Aug. 24, 2023]. Retrieved from the Internet: <URL:https://ntrs.nasa.gov/citations/20180002984> (Year: 2018).*

International Search Report mailed Apr. 24, 2020, issued in corresponding International Application No. PCT/FR2020/050148, filed Jan. 30, 2020, 5 pages.

Written Opinion mailed Apr. 24, 2020, issued in corresponding International Application No. PCT/FR2020/050148, filed Jan. 30, 2020, 6 pages.

Written Opinion mailed Apr. 24, 2020, issued in corresponding International Application No. PCT/FR2020/050148, filed Jan. 30, 2020, 5 pages.

International Preliminary Report on Patentability mailed Jul. 27, 2021, issued in corresponding International Application No. PCT/FR2020/050148, filed Jan. 30, 2020, 7 pages.

* cited by examiner

FAN CASING FOR AN AIRCRAFT TURBOMACHINE

TECHNICAL FIELD OF THE DISCLOSURE

The present disclosure relates to the field of fan casings for aircraft turbomachine.

BACKGROUND

FIG. 1 shows in part a fan of an aircraft turbomachine.

Conventionally, a turbomachine comprises from upstream to downstream, i.e. in the direction of gas flow, a fan, one or more compressors, a combustion chamber, one or more turbines, and an exhaust nozzle for combustion gases leaving the turbine(s).

The fan 1 comprises a blade wheel 2 which is surrounded by a fan casing 3, also known as a retention casing, because of its function of retaining the blades in the event of their breakage or in the event of debris entering the fan.

As can be seen in FIG. 2, the fan casing 3 is generally cylindrical in shape with an axis of revolution A. It comprises an annular fastening flange 3', 3" at each of its axial ends. These flanges 3', 3" are used to fasten the casing 3 to annular walls of the nacelle of the turbomachine.

The fan casing 3 thus extends around the fan blade wheel 2. It comprises an inner cylindrical surface on which an annular layer 4 of abradable material is provided. This annular layer 4 of abradable material extends around and at a short radial distance from the blades, which can in operation rub against the material and wear it away. This optimises the radial clearances between the blades and the fan casing 3 that surrounds it, and therefore limits the gas leakage at the radially outer tips or ends of the blades, and thus optimises the performance of the turbomachine. An example is described in FR-A1-2913053.

In the present technique, this annular layer of abradable material 4 consists of a solid abradable media cartridge or honeycomb structure. This cartridge is usually riveted or screwed to the fan casing.

FIG. 3 is a schematic cross-section illustrating a fan casing 3 according to the prior art.

The fan casing is connected to an air inlet sleeve 5 and to an intermediate casing shell 6. It also carries an upstream acoustic zone 7 and a downstream acoustic zone 8.

The fan casing 3 also comprises an abradable support layer 4 in the form of a cartridge, positioned on an inner side of the fan casing 3, between the upstream acoustic zone 7 and the downstream acoustic zone 8.

A disadvantage of this abradable media cartridge 4 is that it locally increases the thickness of the fan casing 3 and therefore the weight of the fan casing 3.

In addition to this retention function, the fan casing 3 is also designed to:
  ensure mechanical continuity (of forces and moments) between the air inlet sleeve 5 and the intermediate casing shell 6;
  allow the fastening of panels of an aerodynamic duct delimited by the abradable media cartridge 4, the upstream acoustic zone 7 and the downstream acoustic zone 8 thus ensuring continuity of the aerodynamic duct;
  allow the fastening of equipment and supports known per se;
  to meet fire and leakage regulation specifications;
  allow for continuity of electrical current for lightning resistance, etc.

In addition, during operation, the fan blades 2 create a dynamic load comprising rotating pressure-vacuum pockets. This dynamic loading excites the fan casing and causes acceleration and deformation of the fan casing. Indeed, the fan casing can have a forced response to these dynamic loads, which can lead to its deterioration and thus shorten its service life.

The fan casing must therefore have the mechanical strength to perform all these functions and to withstand the dynamic loads during operation of the fan. To this end, in the current technique, the fan casing comprises metal stiffeners on an outer face to reinforce the structure of the fan casing (FIG. 2). These stiffeners are generally an integral part of the casing, making the latter complex and expensive to produce. Furthermore, this adds to the weight of the fan casing.

The present disclosure provides a simple, effective and economical solution to the above-mentioned drawbacks of the prior art.

SUMMARY

To this end, the disclosure relates to a fan casing for an aircraft turbomachine, comprising an annular body extending about an axis A and equipped with an annular fastening flange at each of its axial ends, and an annular coating made from abradable material, characterised in that the body is made from composite material and in that it further comprises an annular stiffener that is arranged inside the body and that carries the coating, this stiffener comprising an annular wall, a radially outer face of which is separated radially from the body and a radially inner face of which receives the coating, the stiffener comprising annular tabs for fastening the wall to the body.

The fan casing according to the disclosure has many advantages. In particular, it proposes to ensure the function of an abradable support while having a reduced mass and proposing an improved retention capacity and overall stiffness.

Advantageously, the annular stiffener has a substantially omega-shaped cross-section.

Preferably and advantageously, the body is made from a preform of woven fibres densified by a polymeric resin.

Such fibres enable to obtain a solution which is both light and resistant.

Advantageously, each of the tabs is generally L-shaped in cross-section and comprises a first annular leg for fastening to the body, and a second annular leg for connecting the wall to the fastening leg, enabling the stiffener and the fan casing body to be secured together.

According to a first embodiment, the connecting leg is substantially perpendicular to the wall and/or to the fastening leg.

According to another embodiment, the connecting leg is inclined with respect to the wall and/or the fastening leg.

Thus, the energy absorption by the fan casing during operation of the fan blades is increased, thus providing greater strength and robustness to the fan casing.

This omega shape of the stiffener, in particular, enables a good compromise between the inertial constraints of the fan casing and the integration constraints of the stiffener of the fan casing according to the disclosure.

Advantageously, the stiffener has a substantially constant thickness, allowing it to be easily manufactured by known folding, draping and trimming techniques.

Advantageously, the wall has a diameter which varies along the axis A.

In this way, the stiffener can conform to the shape of the fan casing for better integration.

Preferably and advantageously, the connecting legs of the fastening tabs have different heights or radial dimensions with respect to the axis A.

Thus, the stiffener conforms to the shape of the fan casing for better integration.

The disclosure also relates to a method for producing a fan casing as described above, characterised in that it comprises:
a) a step for producing the body in composite material,
b) a step for producing the stiffener, for example in carbon folds,
c) a step for placing and fastening, for example by gluing, the stiffener inside the body, and
d) a step for placing and fastening the abradable coating on the radially inner face of the stiffener.

The fan casing thus produced has a weight saving with respect to the fan casings of the prior art, in particular with respect to the screwed or riveted solutions of the prior art, and with improved mechanical characteristics.

The disclosure further relates to an aircraft turbomachine, comprising a fan casing having at least any one of the above characteristics.

As previously indicated, such a turbomachine, due to the presence of a fan casing according to the disclosure, presents a gain in mass reduction, an improvement in stiffness and a gain in manufacturing time and, consequently, a gain in terms of cost.

DESCRIPTION OF THE DRAWINGS

The present disclosure will be better understood and further details, characteristics and advantages of the present disclosure will become clearer from the following description of a non-limiting example, with reference to the attached drawings in which.

DETAILED DESCRIPTION

Figure 1:
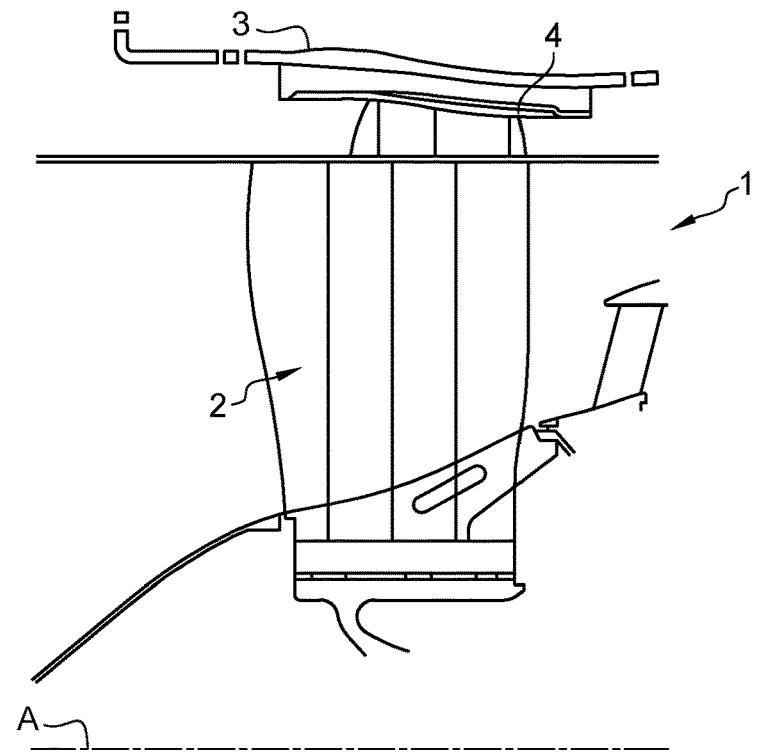
FIG. 1, as previously discussed, shows partially a cross-sectional view of a fan of an aircraft turbomachine according to the prior art.
Figure 2:
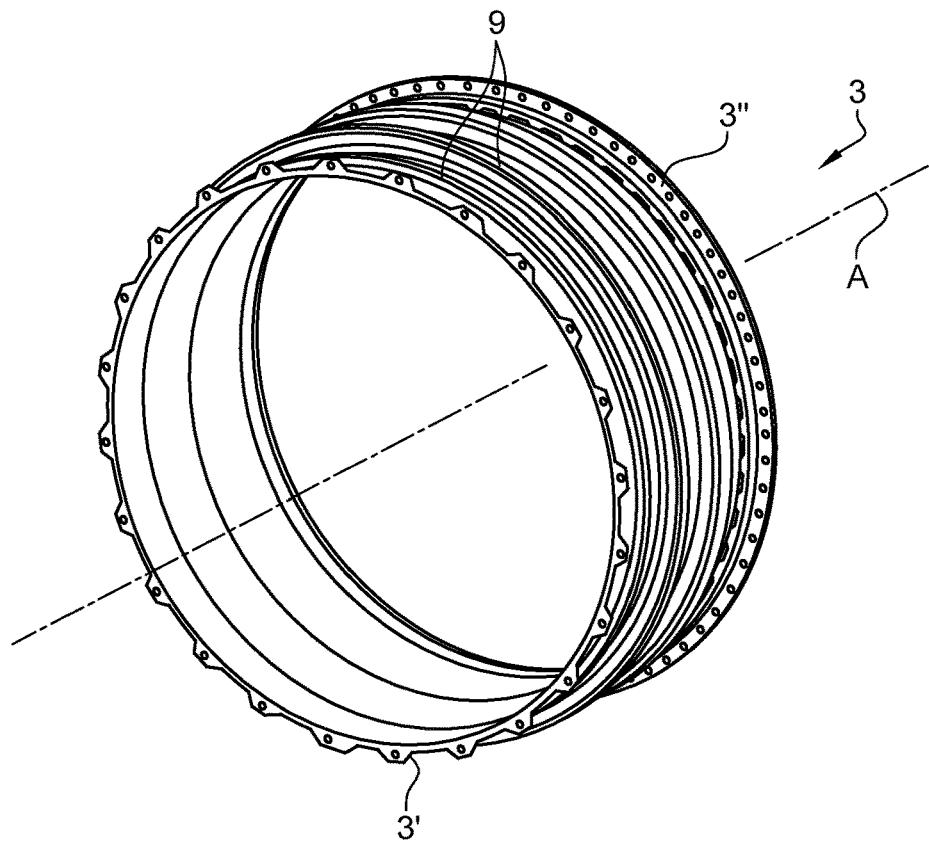
FIG. 2, as previously discussed, shows a perspective view of a fan casing according to the prior art.
Figure 3:
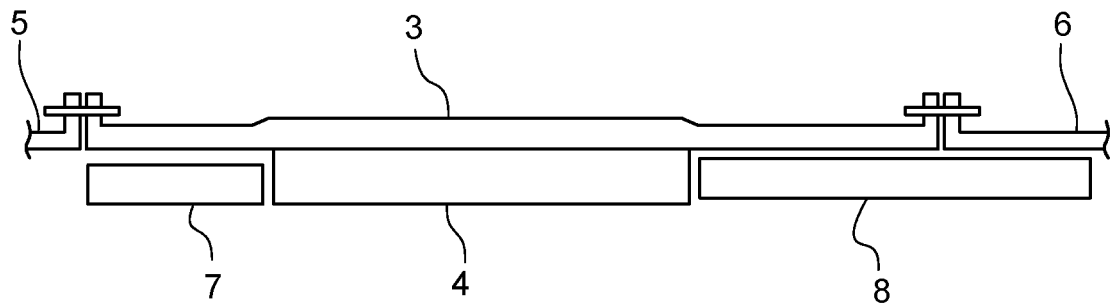
FIG. 3, as previously discussed, shows a schematic partial section of a fan casing according to the prior art.
Figure 4:
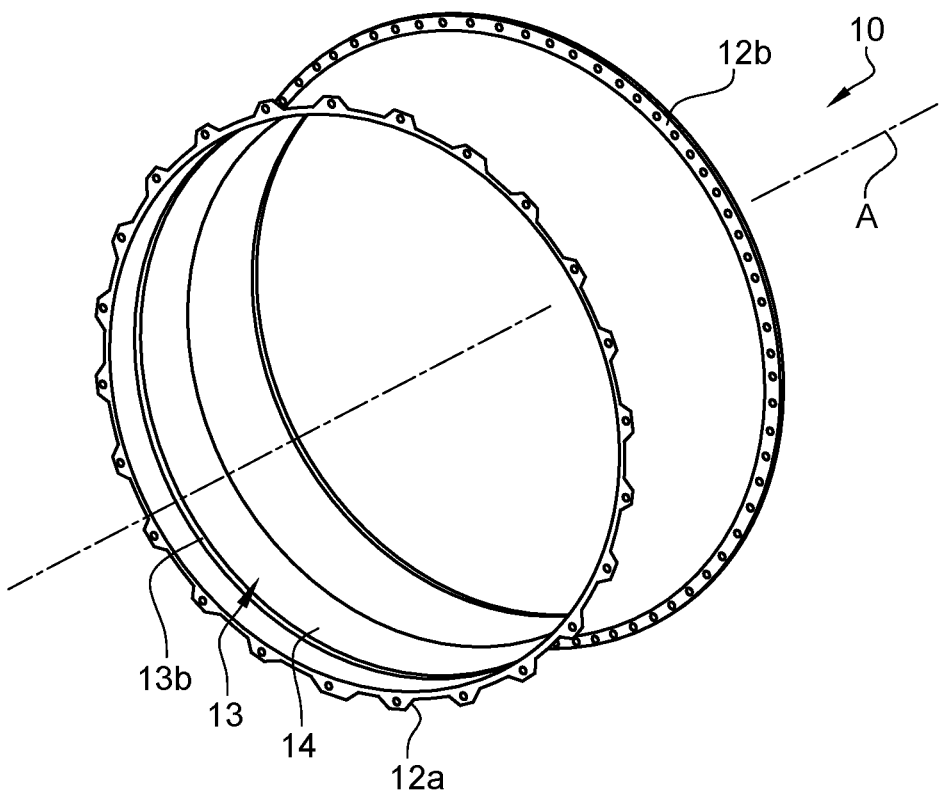
FIG. 4 is a perspective view of a fan casing according to the disclosure.
Figure 5:
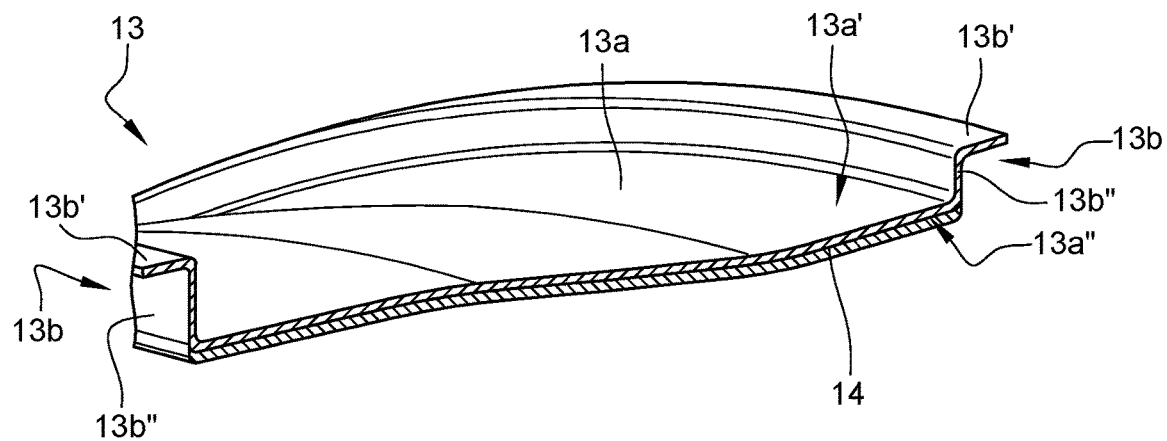
FIG. 5 is a perspective cross-sectional view of an example embodiment of the stiffener provided to the fan casing according to the disclosure.
Figure 6:
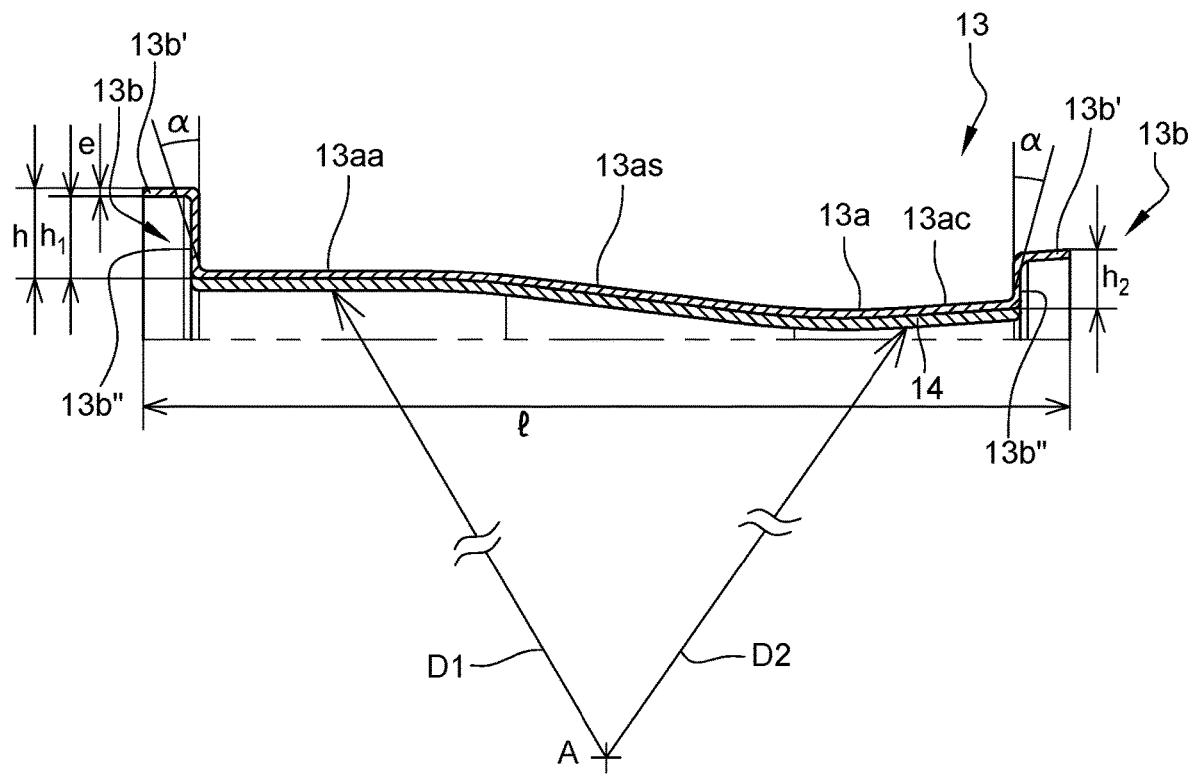
FIG. 6 is a cross-sectional view of the stiffener illustrated in FIG. 5.
Figure 7:
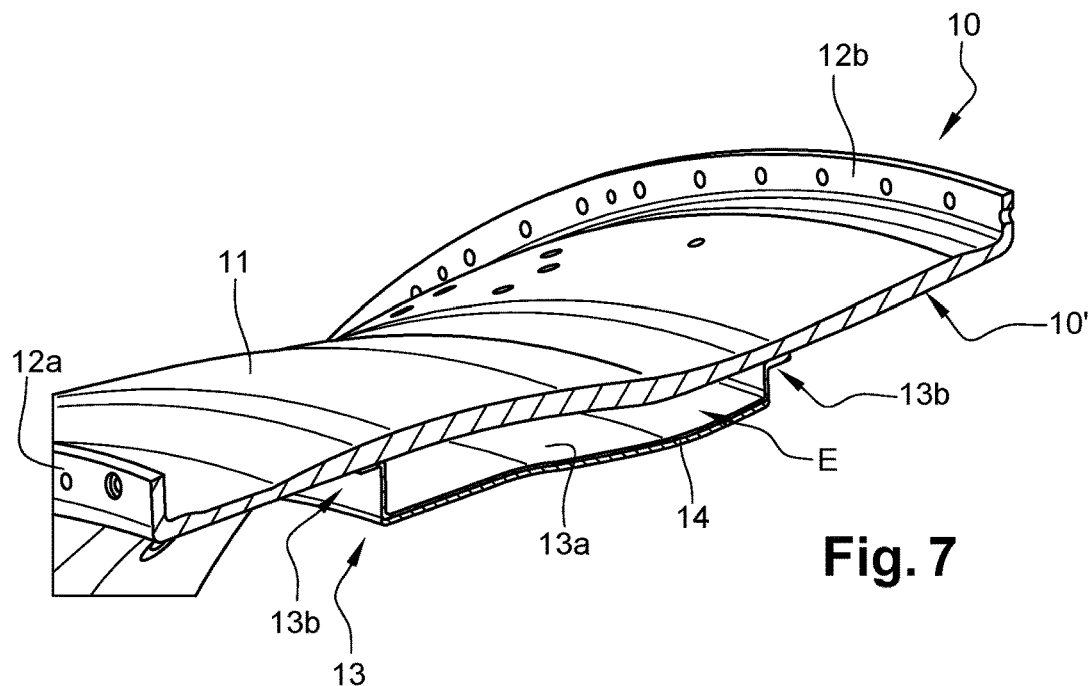
FIG. 7 shows a perspective cross-sectional view of an example embodiment of the fan casing according to the disclosure provided with a stiffener as illustrated in FIG. 5.

With reference to FIG. 4, the casing 10 has a generally cylindrical annular body 11 of axis of revolution A.

In the present disclosure and in the claims, the terms "internal" and "external" and "radial" are defined with respect to the axis A of the casing 10. The terms "upstream" and "downstream" are used with reference to the direction of flow of gas flows in a turbomachine.

The casing 10 comprises an annular fastening flange 12a, 12b at each of its axial ends. These flanges 12a, 12b are used to fasten the casing 10 to annular walls of a turbomachine nacelle that it equips. In the case of an annular fan casing, these flanges 12a, 12b are used to fasten the casing 10 on the one hand to an air inlet sleeve of the turbomachine, and on the other hand to an intermediate casing shell of the turbomachine (not shown).

The annular body 11 is made from a composite material. For example, it is made from a preform of woven fibres, for example three-dimensional, woven, and densified by a polymeric resin.

The annular body 11 of the casing 10 comprises a radially inner annular surface 11' for receiving an annular coating of abradable material. More specifically, the radially inner annular surface 11' of the body 11 is intended to receive an annular stiffener 13 covered with a layer of abradable material coating 14.

The stiffener 13 comprises an annular wall 13a having a radially outer face 13a' and a radially inner face 13a" and annular tabs 13b for fastening the wall 13a of the stiffener 13 to the body 11 of the casing 10.

The radially outer face 13a' of the wall 13a of the stiffener is arranged opposite the radially inner face 11' of the body 11 of the casing 10 and is separated radially from the body 11 of the casing 10, so as to provide an annular space E.

The radially inner face 13a" of the wall 13a of the stiffener 13 receives the abradable coating layer 14.

Each of the annular tabs 13b for fastening the wall 13a of the stiffener 13 to the body 11 of the casing 10 is generally L-shaped in cross-section and comprises a first annular leg 13b' for fastening to the body 11 of the casing 10, and a second annular leg 13b" for connecting the wall 13a of the stiffener 13 to the fastening leg 13b'.

According to the example embodiments shown in FIGS. 5 to 8, the connecting leg 13b" is substantially perpendicular to the wall 13a of the stiffener 13 and/or to the fastening leg 13b'.

Figures 9, 10:
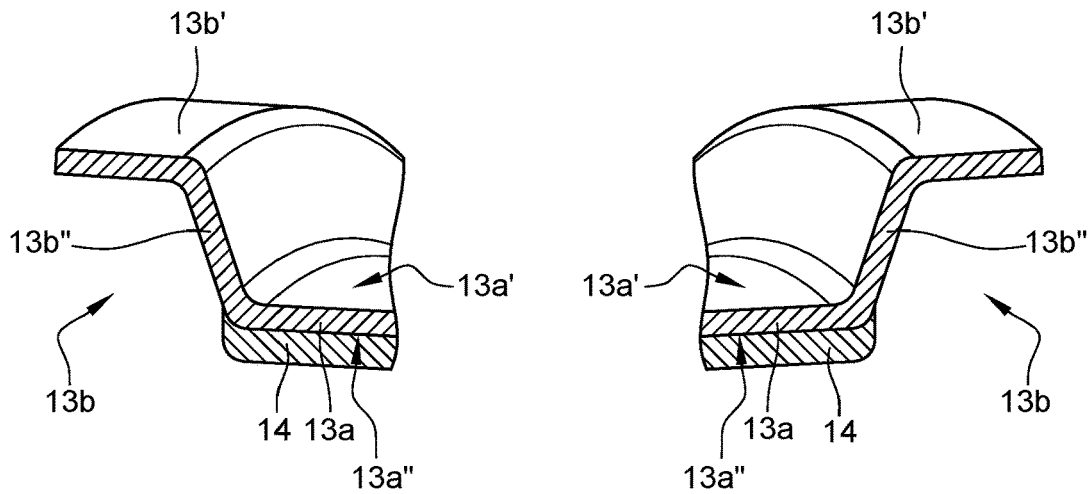
FIG. 9 is a detail view of a further example embodiment of the stiffener provided to the fan casing according to the disclosure.
FIG. 10 is a further detail view of another embodiment of the stiffener provided to the fan casing according to the disclosure.

According to the example embodiments shown in FIGS. 9 and 10, the connecting leg 13b" is inclined with respect to the wall 13a of the stiffener 13 and/or to the fastening leg 13.

The connecting leg 13b" may thus be inclined at an angle α with respect to a normal to the radially outer face 13a' of the wall 13a of the stiffener 13, this angle α being between 10° and 45°. The angles of inclination of each connecting leg 13b" of the flanges 13b may be identical or different.

The annular stiffener 13 thus has a substantially omega ("Ω") (capitalized) cross-section.

The stiffener 13 is here located in a central portion of the radially inner annular surface 11' of the body 11 of the casing 10 and is intended to extend opposite the top of the blades of the fan wheel.

The stiffener 13 extends 360° continuously across the radially inner annular surface 11' of the body 11. The stiffener 13 has an axial length or dimension I, along the axis A, of between 40 and 60% of the length of the fan casing 10, and in the example shown is 50% of the length of the fan casing 10. The stiffener 13 has, for example, an axial dimension I of about 400 mm and a height h of about 30 mm. It also has a substantially constant thickness e. For example, the stiffener has a thickness e of the order of 5 mm.

The stiffener 13 is, for example, made of carbon folds giving it significant mechanical strength, i.e., a gain in stiffness through improved mechanical characteristics. The stiffener 13 thus has a mass of around 5.5 kg.

According to the illustrated embodiment but by no means limiting, the wall 13a of the stiffener 13 has a diameter that varies along the axis A. In particular, the wall 13a of the stiffener 13 comprises an upstream portion 13aa of diameter D1 and a downstream portion 13ac of diameter D2, the upstream 13aa and downstream 13ac portions being connected by an intermediate portion 13ab. The diameter D1 of the upstream portion 13aa is greater than the diameter D2 of the downstream portion 13ac, the diameter of the intermediate portion 13ab thus varying in a decreasing manner between a diameter D1 and a diameter D2.

Figure 8:
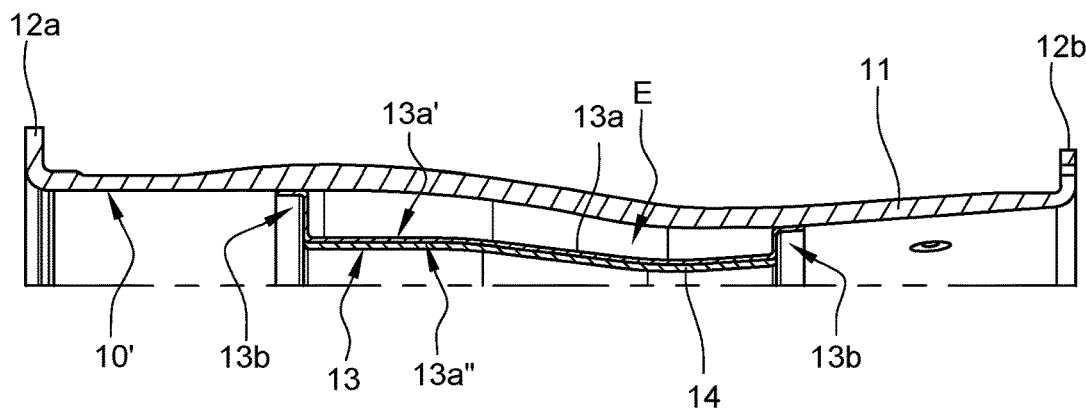
FIG. 8 shows a cross-sectional view of the fan casing illustrated in FIG. 7.

As can be seen in FIG. 8, the cross-section of the wall 13a of the stiffener 13 thus substantially replicates the cross-section of the body 11 of the fan casing 10.

Interestingly, but by no means limiting, the connecting legs 13" of the fastening tabs 13b have different heights h1, h2 or radial dimensions with respect to the axis A of revolution of the fan case 10. For example, the connecting leg 13b" of the fastening tab 13b at the upstream annular lateral end of the upstream portion 13aa of the wall 13a of the stiffener 13 has a height h1 greater than the height h2 of the connecting leg 13b" of the fastening tab 13b at the downstream annular lateral end of the downstream portion 13ac of the wall 13a of the stiffener 13.

The omega ("Ω") shape of the stiffener 13 gives it significant mechanical strength and retention capacity allowing greater absorption of energy during operation of the turbomachine, while keeping empty the annular space E provided between the outer face 13a' of the annular wall 13a of the stiffener 13 and the radially inner annular surface 11' of the body 11 of the casing 10, further adding to the gain in mass reduction of the fan casing 10 according to the disclosure.

Furthermore, the stiffener 13 thus has a simple and inexpensive shape to manufacture, unlike the honeycomb solutions of the prior art requiring a pre-machining of the abradable honeycomb coating, a draping step, the laying of the abradable honeycomb coating, a trimming step, a machining step, and a step of gluing the abradable honeycomb coating to the fan casing. Moreover, the honeycomb coating constitutes a solid core unlike the stiffener 13 of the present disclosure, the latter therefore requiring less raw material for its manufacture, which constitutes a further economic gain.

The method of producing a fan casing 10 according to the disclosure is simple, rapid and therefore inexpensive to implement, and comprises the following steps:
a) a step for producing the body 11 in composite material,
b) a step for producing the stiffener 13, for example in carbon folds,
c) a step for placing and fastening, for example by gluing, the stiffener 13 inside the body 11, and
d) a step for placing and fastening the abradable coating 14 on the radially inner face 13a" of the stiffener 13.

For example, the body 11 and the stiffener 13 are produced by draping and trimming steps.

Furthermore, the secured gluing of the stiffener 13 and the body 11 of the casing 10 allows a reduction in the mass of the assembly compared to a screwed or riveted solution.

The steps a) and b) can be carried out simultaneously, and the order of steps c) and d) can be reversed.

In order to respect the mounting interfaces of the stiffener 13 and the unmachined casing 10 of the body 11, directly out of the mould, it may be envisaged to use a tooling allowing to conform the stiffener 13 to the right dimensions with respect to the fan casing 10 for which it is intended. It is also envisaged to characterise a method of positioning the stiffener 13 on the fan casing 10 such as a laser or mounting template.

Thus, according to the disclosure, the mechanical strength of the fan casing 10 is improved as well as the overall cycle time of the manufacturing method.

The present disclosure also relates to an aircraft turbomachine comprising, from upstream to downstream, i.e. in the direction of flow of the gas flows, a fan, one or more compressors, a combustion chamber, one or more turbines, and an exhaust nozzle for combustion gases leaving the turbine(s), the fan comprising a blade wheel surrounded by a fan casing 10 according to the disclosure.

The invention claimed is:

1. A fan casing for an aircraft turbomachine, comprising an annular body extending about an axis (A) and equipped with an annular fastening flange at each of its axial ends, and an annular coating made from abradable material, wherein said annular body is made from a composite material and further comprises an annular stiffener configured to reinforce and increase the stiffness of the structure of the fan casing, the fan casing being configured to surround a plurality of blades, the annular stiffener is arranged radially inside said annular body and carries said coating, said stiffener comprising an annular wall, a radially outer face of which is separated radially from the annular body and a radially inner face of which receives said coating, wherein the fan casing comprises an empty annular space between the annular wall of the stiffener and the annular body of the fan casing, the empty annular space having a fixed shape and a fixed volume, wherein the annular stiffener comprises annular tabs configured to fasten said wall to said annular body, wherein the annular stiffener has a constant omega-shaped cross-section in capital form providing mechanical strength, retention capacity and keeping the form of the annular space, and wherein the annular wall and the annular tabs of the annular stiffener are integrally formed, wherein the annular stiffener comprising carbon folds increasing its stiffness, wherein each of said tabs is L-shaped in cross-section and comprises a first annular leg configured to fasten to the annular body, and a second annular leg configured to connect the wall to said first annular leg.

2. The fan casing according to claim 1, wherein said annular body is made from a preform of woven fibres and densified by a polymeric resin.

3. The fan casing according to claim 1, wherein said stiffener has a constant thickness (e).

4. The fan casing according to claim 3, wherein the stiffener has a constant thickness of 5 mm.

5. The fan casing according to claim 1, wherein said wall has a diameter which varies along said axis (A).

6. A method for producing a fan casing according to claim 1, the method comprising:
a) producing the annular body in composite material,
b) producing the stiffener,
c) placing and fastening the stiffener inside the body, and
d) placing and fastening the abradable coating on the radially inner face of the stiffener.

7. The method according to claim 6, wherein the stiffener is produced in carbon folds.

8. The method according to claim 6, wherein the stiffener is glued to the fan body.

9. An aircraft turbomachine, comprising a fan casing according to claim 1.

10. The fan casing according to claim 1, wherein said stiffener is located in a central portion of the body and is configured to extend opposite top of blades of a fan wheel.

11. The fan casing according to claim 1, wherein the stiffener has an axial length or dimension, along the axis of rotation, of between 40 and 60% of the length of the fan casing.

12. The fan casing according to claim 1, wherein the stiffener is made from carbon folds.

13. The fan casing according to claim 1, wherein the annular wall and the annular tabs are produced in carbon folds.

14. The fan casing according to claim 1, wherein the stiffener has an axial dimension of about 400 mm and a height of 30 mm.

15. The fan casing according to claim 1, wherein the first annular leg and the second annular leg are perpendicular to the wall or inclined with regard to the wall of the stiffener.

16. A fan casing for an aircraft turbomachine, comprising an annular body extending about an axis (A) and equipped with an annular fastening flange at each of its axial ends, and an annular coating made from abradable material, wherein said body is made from a composite material and further comprises an annular stiffener that is made of composite material and arranged inside said body, the stiffener carrying said coating, said stiffener comprising an annular wall, a radially outer face of which is separated radially from the body and a radially inner face of which receives said coating, wherein an empty annular space having a fixed shape and a fixed volume is provided between the body and the annular wall, wherein the stiffener comprises annular tabs glued to said body, wherein the stiffener comprising carbon folds increasing its stiffness.

17. The fan casing according to claim 16, wherein the annular wall and the annular tabs of the stiffener are integrally formed.

18. The fan casing according to claim 16, wherein each of said tabs is L-shaped in cross-section and comprises a first annular leg configured to fasten to the annular body, and a second annular leg configured to connect the wall to said first annular leg.

19. The fan casing according to claim 18, wherein said second annular leg is perpendicular to at least one of said wall and said first annular leg.

20. The fan casing according to claim 18, wherein said second annular leg is inclined with respect to at least one of said wall and said first annular leg.

21. The fan casing according to claim 18, wherein the second annular legs of the tabs have at least one of different heights (h1, h2) and different radial dimensions with respect to said axis (A).

* * * * *